Oct. 18, 1960
N. M. ANDERSON ET AL
2,956,584
CHECK VALVE
Filed Dec. 17, 1956
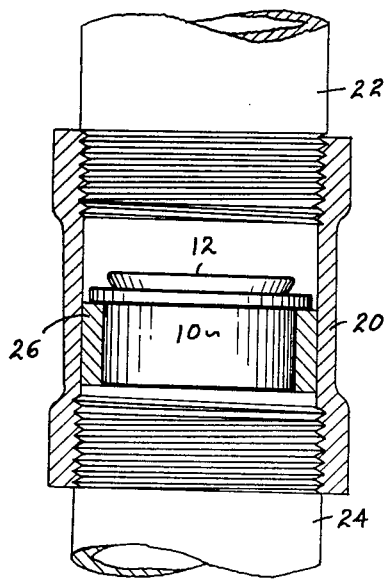
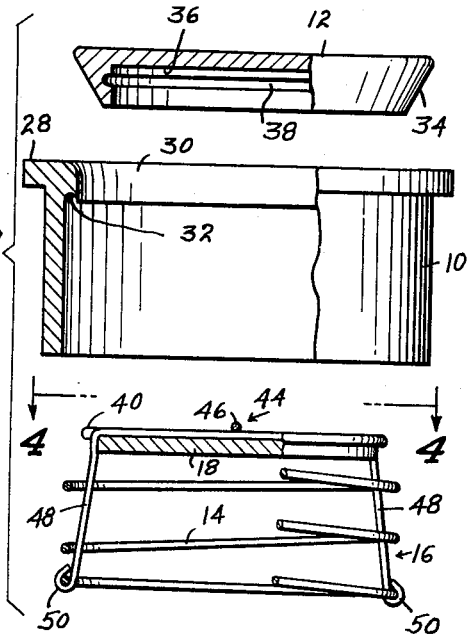
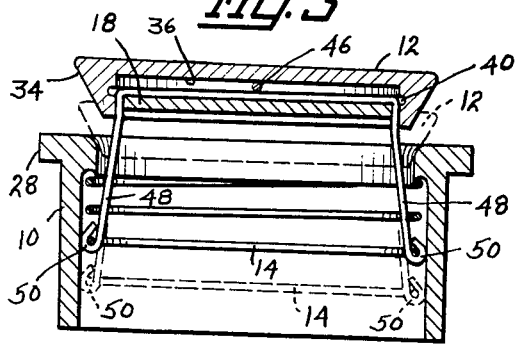
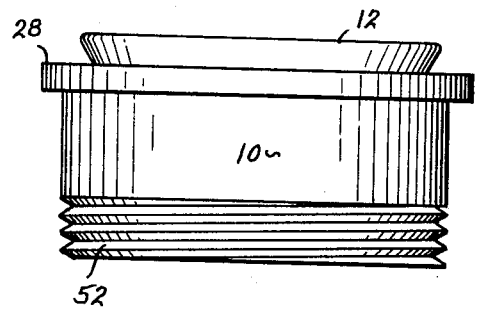
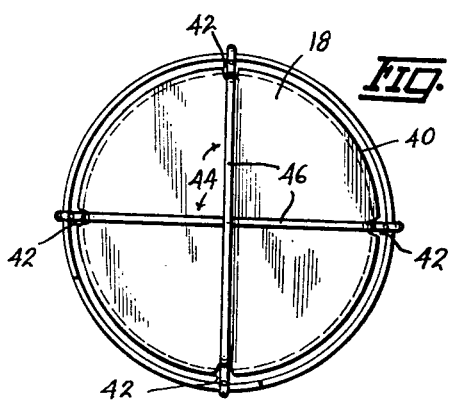
INVENTORS.
NOEL M. ANDERSON
ROY F. DAVIS
BY *Morton S. Adler*
ATTORNEY.

United States Patent Office 2,956,584
Patented Oct. 18, 1960

2,956,584

CHECK VALVE

Noel M. Anderson and Roy F. Davis, Des Moines, Iowa, assignors to Check-All Valve Company, Des Moines, Iowa, a corporation of Iowa Filed Dec. 17, 1956, Ser. No. 628,806

7 Claims. (Cl. 137—541)

Our invention relates to check valves for use in water, gas, air or hydraulic flow lines.

One of the important objects contemplated herein is the provision of a new and improved structure for check valves including the elimination of arranging any elements so as to cause some obstruction or impediment in the path of flow.

More particularly it is an object of this invention to provide a check valve wherein a valve cap is mounted to a cylindrical housing by means of a coil spring concentrically disposed within the housing so as to provide practically no obstruction in the cross section area of the housing.

Still another object inhering herein is the provision of a check valve of the above class having improved means for assuring accurate seating of the valve cap.

Further objects are to provide a check valve that is extremely economical to manufacture, is durable in construction and highly efficient for its intended use.

Other objects and advantages of this invention reside in the details of construction and correlation of the various parts and will be apparent as the description proceeds.

This invention consists of novel parts and combination of parts to be hereinafter described whereby the objects set forth are attained, as pointed out in the claims, and illustrated in the accompanying drawings, in which:

Fig. 1 is an elevational view of our new check valve shown positioned in a fitting connecting two sections of pipe and with the fitting shown in cross section, Fig. 2 is an enlarged exploded view of this invention shown partly in section to more clearly illustrate its construction, Fig. 3 is a cross sectional view of our invention showing the valve cap unseated and with broken lines indicating the seated position thereof, Fig. 4 is a top plan view of the spring arms and insert plug of the valve cap assembly taken from the line 4—4 of Fig. 2, and, Fig. 5 is an elevational view showing a modification of our invention.

Referring to the drawings our check valve comprises generally a housing 10, valve cap 12 and an annular resilient means such as a coil spring 14. Cap 12 includes a spring arm assembly 16 and an insert plug 18 for mounting assembly 16 to cap 12 as will later appear. A check valve of the type here disclosed will normally be placed in a suitable fitting connecting two pipe sections and for the purpose of illustrating the use of this valve, such a fitting is designated by numeral 20 in Fig. 1 intermediate the pipe sections 22 and 24. Fitting 20 as shown is provided with the internally projecting annular shoulder 26.

Housing 10 is cylindrical in shape and on one end has the projecting annular flange 28 for engagement with the shoulder 26 within fitting 20. On the same end as flange 28 the opening in the housing 10 is somewhat reduced and provided with a small radius to serve as the valve seat 30. This reduction in diameter provides the internal annular shoulder 32 within the housing 10 which is formed as a groove (Fig. 2). Cap 12 has its perimeter 34 tapered at preferably 30° (Fig. 2) and is designed to seat in the valve seat 30 as shown in Fig. 3.

The bottom of cap 12 is provided with a recess or socket 36 and includes the groove 38 in the side walls thereof. A disc like insert plug 18 has a peripheral rib 40 and four equally spaced notches 42 in its perimeter as shown in Fig. 4. The spring assembly 16 comprises a pair of like rod spring arms indicated generally at 44 which are substantially of an inverted U shape having the base member 46 forming the closed end of the U and the oppositely disposed parallel extending arms or fingers 48 which at their free ends are turned outwardly and upwardly to form the hooks 50. The base members 46 of springs 44 are mounted across the top of plug 18 in the shape of a cross (Fig. 4) so that each arm or finger 48 projects downwardly through one of the respective recesses 42 and extends on a slight outward angle therefrom as shown in Fig. 3. Thus arranged, plug 18 can be snapped into socket 36 with rib 40 on the plug seating in groove 38 and members 46 of the springs 44 being confined within the cap as shown in Fig. 3. We have preferably made this valve unit of nylon which affords an easy snap fit of the plug as described and also makes for economy in manufacture. However, it will be understood that any suitable material may be used and the plug can be cemented to the cap, if desired, without any change in principle or function.

The coil spring 14 is mounted within housing 10 so that one end designated as the inner end nests in groove or shoulder 32 (Fig. 3) and the other end or outer end is engaged by the respective hooks 50 on the fingers 48. In this position each hook 50 is in slidable contact with the inner housing wall which serves as a guide means therefor and spring assembly 16 together with cap 12 are rotatable relative to housing 10 so as to turn in response to any swirling fluid and thus aid in keeping the valve seat clean.

In operation spring 14 is normally compressed to hold the cap 12 on seat 30 in closed position. Pressure from material flowing through the line in a direction from bottom to top in Fig. 1 will unseat the cap 12 as shown in solid lines in Fig. 3. With the release of pressure, spring 14 will return the cap 12 to closed position. In the return action, hooks 50 are guided against the housing wall to assure accurate seating of the cap.

The preferable arrangement for this valve is a slip fit or friction fit in fitting 20 but the same may have threads 52 as shown in Fig. 5 for use in an obvious manner.

It is pointed out that control of cap 12 by the coil spring 14 leaves the path of flow completely open for all practical purposes and affords this valve a decided advantage over other type check valves which employ some variation of a spider assembly across the path of flow to effect movement of the cap.

It is submitted that the invention shown and described is aptly suited to achieve the purposes intended and is characterized by a combination of highly useful and mutually cooperating elements that combine their respective and proportionate functions in accomplishing the objects sought to be obtained.

It will be understood that the phraseology employed herein is for the purpose of description and not for limitation and that modifications and changes in the construction and arrangement of this invention can be made within the scope of what is claimed, without departing from the spirit and purpose thereof. It is thus intended to cover by the claims, any modified forms of structure or

We claim:

1. In a check valve, a housing having a valve seat, an internal annular shoulder within said housing, an annular resilient means disposed within said housing so that one end abuts said shoulder, a valve cap seatable on said valve seat, a plurality of spaced fingers projecting from the perimeter of said cap, a hook on the free end of each finger, said hooks being attached to the other end of said resilient means, and said hooks being in slidable engagement with the inner wall of said housing.

2. In a check valve, a cylindrical housing having a valve seat, an internal annular shoulder within said housing, an annular resilient means disposed within said housing so that one end abuts said shoulder, a disc shaped valve cap seatable on said valve seat, a plurality of fingers in spaced concentric relationship projecting from the perimeter of said valve cap in the same direction, a hook on the free end of each finger, said hooks being attached to the other end of said resilient means, and said hooks being in slidable engagement with the inner wall of said housing.

3. In a check valve, a housing having a valve seat, an internal annular shoulder within said housing adjacent said valve seat, an annular resilient means disposed within said housing so that one end abuts said shoulder, a valve cap seatable on said valve seat, a plurality of spaced fingers projecting from the perimeter of said cap, a hook on the free end of each finger, said hooks attached to the other end of said resilient means, and said hooks in slidable engagement with the inner wall of said housing to provide a guide means for accurately seating said valve cap.

4. In a check valve, a cylindrical housing having a valve seat, an internal annular shoulder within said housing adjacent said valve seat, a coil spring disposed within said housing so that one end abuts said shoulder, a disc shaped valve cap seatable on said valve seat, a plurality of fingers in spaced concentric relationship projecting from the perimeter of said valve cap in the same direction, a hook on the free end of each finger, said hooks attached to the other end of said coil spring, and said hooks in slidable engagement with the inner wall of said housing to provide a guide means for accurately seating said valve cap.

5. In a check valve, a cylindrical housing having a valve seat, an internal annular shoulder within said housing adjacent said valve seat, a coil spring disposed within said housing so that one end abuts said shoulder, a disc shaped valve cap seatable on said valve seat, said valve cap provided with a socket, a pair of inverted U shaped spring members consisting of a closed portion and integral fingers, an insert plug complementary in shape to said socket, said spring members having their closed portions disposed within said socket so that their fingers project therefrom in spaced concentric relationship, said insert plug mountable in said socket to secure said spring members therein, and the free ends of said fingers attached to the other end of said coil spring.

6. In a check valve, a cylindrical housing having a valve seat, an internal annular shoulder within said housing, a coil spring disposed within said housing so that one end abuts said shoulder, a disc shaped valve cap seatable on said valve seat, said valve cap provided with a socket, a pair of inverted U shaped spring members consisting of a closed portion and integral fingers, an insert plug complementary in shape to said socket, said spring members having their closed portions disposed within said socket so that their fingers project therefrom in spaced concentric relationship, said insert plug mountable in said socket to secure said spring members therein, a hook on the free end of each finger, and said hooks attached to the other end of said coil spring.

7. A device as defined in claim 6 characterized by said hooks being in slidable engagement with the inner wall of said housing to provide a guide means for accurately seating said valve cap.

References Cited in the file of this patent

UNITED STATES PATENTS

| | | |
|---|---|---|
| 548,834 | Lafferty | Oct. 29, 1895 |
| 625,292 | Demarest | May 16, 1899 |
| 650,650 | Niehoff | May 29, 1900 |
| 1,814,549 | Fortune | July 14, 1931 |
| 1,911,284 | Nichols | May 30, 1933 |
| 1,945,872 | Tappe | Feb. 6, 1934 |
| 1,997,116 | Nielsen | Apr. 9, 1935 |
| 2,039,952 | Donnelly | May 5, 1936 |
| 2,241,758 | Baldine | May 13, 1941 |

FOREIGN PATENTS

| | | |
|---|---|---|
| 156,011 | Great Britain | Jan. 6, 1921 |